United States Patent [19]

Ikoma et al.

[11] Patent Number: 4,503,081

[45] Date of Patent: Mar. 5, 1985

[54] METHOD FOR PRODUCING SURFACE-COLORED FISH-PASTE PRODUCTS AND PRODUCTS THUS PRODUCED

[75] Inventors: Mitsugi Ikoma, Kawagoe; Takeo Shinada; Hisashi Nozaki, both of Sayama, all of Japan

[73] Assignee: Kabushiki Kaisha Kibun, Tokyo, Japan

[21] Appl. No.: 399,745

[22] Filed: Jul. 19, 1982

[30] Foreign Application Priority Data

Nov. 9, 1981 [JP] Japan ................................. 56-179199

[51] Int. Cl.$^3$ ........................ A23L 1/27; A23L 1/325
[52] U.S. Cl. .................................... 426/268; 426/305;
426/574; 426/643; 426/407; 426/412; 426/521
[58] Field of Search .............. 426/262, 268, 305, 574, 426/643, 466, 407, 412, 521

[56] References Cited

U.S. PATENT DOCUMENTS 3,925,561 12/1975 Herstel et al. .................. 426/268 X

FOREIGN PATENT DOCUMENTS 50-30708 10/1975 Japan ................................... 426/262
1006683 10/1965 United Kingdom ................ 426/268

OTHER PUBLICATIONS

Talley, E. A., et al., "New Quantitative Approach to the Study of Nonenzymatic Browning", Agr. and Food Chem., vol. 16, No. 2, Mar./Apr. 1968, pp. 262–264.

*Primary Examiner*—Robert Yoncoskie
*Attorney, Agent, or Firm*—Robert E. Burns; Emmanuel J. Lobato; Bruce L. Adams

[57] ABSTRACT

A fish-paste product colored only on its surface and not in its inner parts is produced by applying a sugar or a sugar-amino acid mixture as a coating onto the surface of a ground fish meat molded product and then heating the molded product thus coated thereby to develop the desired color on the surface thereof.

16 Claims, No Drawings

METHOD FOR PRODUCING SURFACE-COLORED FISH-PASTE PRODUCTS AND PRODUCTS THUS PRODUCED

BACKGROUND OF THE INVENTION

1. Field of the Art

This invention relates to a method for producing molded fish-paste products which are colored on only their surfaces through the so-called Maillard reaction. The invention further relates to surface-colored molded fish-paste products thus produced, particularly those packaged and sterilized in sealed containers.

Hitherto, the general methods for browning fish-paste products have comprised adding a color-forming agent such as a sugar or an amino acid to ground fish meat (seasoned if desired), molding the material into desired shapes such as a cylinder, a thick sheet, a bar of elliptical cross section, or a ball, and then heating the molded material by oil heating, burner heating, high-frequency heating or the like, whereby the surfaces of the products are colored by utilization of the Maillard reaction.

There have been several problems, however, in the conventional coloring methods. One of the problems is that the amount of color-forming agents to be added in order to realize color development is often restricted with respect to the resulting taste, because the sugar or amino acid used as the color-forming agent is also a seasoning agent.

The other problems generally observed in the conventional coloring methods are related to heating. One of these is nonuniform color. Because fish-paste products are generally subjected to multi-stage heating in the course of processing, the sugar or the amino acid is partially eluted in the first heating, and the resulting product is apt to be nonuniformly browned in the second or third heating. Another problem in connection with the heating is that not only the surface but also the inside parts of the product are colored. For example, when canned fish-paste products are subjected to retort-heating, the product is browned as far as the center portion thereof, and its commercial value is markedly impaired.

SUMMARY OF THE INVENTION

An object of the present invention is to solve the above-mentioned problems. The object has been achieved by applying a sugar or an amino acid used as a color-forming agent onto the surfaces of fish-paste molded products and heating the products.

Thus, the method for production of a surface-colored fish-paste product is characterized by applying a color-forming agent selected from a sugar or a sugar-amino acid mixture onto the surface of a ground fish meat molded product and then subjecting the molded product to heating to develop color on the surface thereof.

All of the above-described problems are solved according to the present invention because the color-forming agent is applied to the surface of the product, and no effect is imparted to the inner part of the product. The method of the present invention requires one more step than the conventional coloring method. The application of the color-forming agent, however, can be carried out by a simple step, for example, by immersion of the molded fish-paste product in a solution of the color-forming agent. Thus, the increase of such a processing step causes substantially no additional trouble.

DETAILED DESCRIPTION OF THE INVENTION

1. Production of Ground Fish Meat Molded Products

The ground fish meat molded product of which the surface is to be colored according to the present invention is the same as the conventional products except that the sugar or sugar-amino acid mixture used as the color-forming agent has not been added thereto, and thus this uncolored product can be produced by a conventional method.

The conventional method for production of such molded products comprises molding ground fish meat (if desired, with auxiliary materials added thereto) into a desired shape. The fish to be used as raw material include, for example, codfish, Alaska pollack, bonito, croaker, shark, mackeral, sardine, Atka mackerel and the like. The fish material is processed into fish chops (i.e., the fish is dismembered into fillets, which are then chopped by means of a chopper). The fish chops, or the chops which have been refined with water if desired, are further ground, and then mixed and kneaded with auxiliary materials to obtain ground fish meat to be used as the molding material.

Examples of auxiliary materials which can be admixed into the ground fish meat are seasoning agents (amino acids, natural seasoners of nucleic acid sources or animal- or vegetable-sources, etc.), coloring matters (carotenoid, annato, caramel, chlorophyll, etc.), perfumes (pepper, nutmeg, cinnamon, etc.), modifiers (polyphosphates), etc., and water. Of course, other materials can also be used as auxiliary material if so desired. The sugar or amino acid used as the auxiliary material can be selected or metered for seasoning only, without restriction of the species or the amount of addition thereof. That is, no consideration whatsoever of the coloring by the Maillard reaction in the later step is needed. The resulting ground fish meat mixture is molded into the shapes of final products such as fried fish-paste products (e.g., flat and round), hollow-cylindrical fish-paste products, and the like.

By the term "ground fish meat" used in the present specification and claims is meant a paste-like fish meat product obtained by grinding fish meat irrespective of whether or not it has been refined with water, contains an auxiliary material, is a frozen product, or has some other characteristic.

2. Color-forming Agent

The color-forming agent used in the present invention can be an agent which is capable of browning fish proteins via the Maillard reaction, that is, a sugar or a combination of a sugar and an amino acid.

As the sugar, use can be made of a natural or synthetic sugar, especially a reducing sugar, such as xylose, glucose, or a "mirin" (a sweet Japanese wine for seasoning). More specifically, among the sugars are included, for example, xylose alone, a mixture of xylose and glucose, and the like.

Examples of the amino acid to be used concomitantly with such sugars are sodium glutamate, glycerine, alanine, and aspartic acid. The ratio of the amino acid to the sugar used concomitantly is optionally determined as long as the desired coloring effect is realized.

As mentioned above, the amounts, the species and the ratio to be used of these color-forming agents can be determined so as to obtain the coloring effect which takes place in the later heating step without consideration of the effect as a seasoning agent.

3. Application of the Color-forming Agent

The application of such color-forming agents to the surface of a fish-paste molded product can be carried out by any appropriate method.

One of such methods is to immerse the ground fish molded product in a solution of the color-forming agent once or several times. The immersion bath is typically an aqueous solution having a suitable concentration of the color-forming agent, for example, having a sugar concentration of about 0.1 to about 2.0%, preferably about 0.2 to about 1.5%, by weight and an amino acid concentration of 0 to about 0.8% by weight. The immersion time is generally of the order of 1 to 80 seconds.

Another method of applying the color-forming agent is to spray such a solution of a color-forming agent as mentioned above onto the surface of the ground fish molded product one or more times.

The application of the color-forming agent may also be done by mixing the color-forming agent with a powdery diluent and depositing the mixture on the surface of the ground fish molded product one or more times.

The color-forming agent can be applied by any application method to either an unheated or already-heated molded product of ground fish meat (even in the latter case, the heating for the color-development is of course additionally needed). An example of the already-heated product is a preheated ground fish molded product to be finished by frying (which has been steam-heated or gelation-heated at a low temperature in advance).

4. Color-developing Treatment

A ground fish molded product, to the surface of which the color-forming agent has been applied, as described above, is then subjected to heating to develop the color on the surface thereof.

The heating temperature for the color development is a temperature high enough to develop the color. In general a temperature of 100° C. or higher is suitable. The upper limit of the heating temperature is of the order of 300° C. The heating can be carried out by oil heating, burner, heating, high-frequency heating, or any other appropriate heating method suitable for the products.

A unique heating method involves using a solution of the color-forming agent as a heating medium. In other words, a ground fish molded product can be colored by heating it in a solution of the color-forming agent.

Both the heating for coloring and the heating in a production step of fish-paste products can be done simultaneously in one heating step, if so desired.

5. Fish-paste Products

The fish-paste product obtained by the present invention is a product which has been colored substantially on only its surface.

The fish-paste product which realizes the effectiveness of the present invention best is a product which has been produced via a retort heating step ordinarily under pressure (i.e., a heat-sterilization step in a sealed container), and which has been colored substantially on only its surface. More specifically, the product is one packaged in a can or a pouch made of a plastic film or a metal foil and one in which, in the case of a conventional product, browning has reached the center portion of the product and its commercial value has been lowered.

By retort sterilization is meant wet heating at about 120° C. for about 4 minutes to carry out commercially acceptable sterilization (i.e., so as to completely kill growable microorganisms in food packaged in a container) or other sterilization methods having substantially the same or even stronger sterilization effect as the above-mentioned wet-heating. The sterilization is generally conducted under pressure.

6. Experiments

In the following examples, all the parts and percents are by weight unless otherwise specified.

EXAMPLE 1

One hundred (100) parts of ground Alaska pollack meat, 3 parts of sodium chloride, 0.5 part of sodium glutamate and 30 parts of water were mixed by agitation. The resulting ground meat mixture was molded into strip-like pieces. Separately, a dilute solution heated to 70° C. and containing 0.6% xylose was placed in a vessel of a specific depth. The above described molded product was immersed in the solution for 10 to 20 seconds. Immediately upon being taken out of the solution, the soaked product was heated in a relatively low-temperature oil pan (110° C.) for 150 seconds and subsequently in a relatively high-temperature oil pan (180° C.) for 45 seconds to obtain fried fish-paste product pieces. The surface of the resulting fried product had a bright brown color which was appetite-stimulating.

EXAMPLE 2

Molded product pieces of the ground fish mixture obtained as in Example 1 were moved on a conveyor and sprayed by a shower with a 1% dilute solution containing glucose and glycine in the ratio of 5 to 1 by weight. Immediately after the spraying, the pieces were heated in a low-temperature oil pan (110° C.) for 2 minutes and then in a high-temperature oil pan (180° C.) for 50 seconds to obtain fried fish-paste product pieces. The surface of the resulting fried product was brown and colored uniformly.

Moreover, the fried product was packaged in a retort pouch and subjected to retort heating at 125° C. for 40 minutes, which was followed by cooling. The heated fried product was cut, and the degree of browning in the center portion thereof was checked. No browning in the center was observed.

EXAMPLE 3

One hundred (100) parts of ground Alaska pollack meat, 2.8 parts of sodium chloride, 0.4 part of sodium glutamate, 2 parts of sorbitol, 20 parts of water and 8 parts of potato starch were mixed by stirring. Then 1.0 part of glucose was added, and the mixture was agitated. The ground fish mixture was molded into hollow-cylindrical product pieces, which were then subjected to gelation-heating at 45° C. for 7 minutes. At this stage, the surface of the cylindrical product was slightly coagulated by heating, and no coloring was observed. The gelation-heated product pieces were then subjected to burner-heating at 250° C. for 3 minutes to obtain baked cylindrical fish-paste product pieces (hereinafter referred to as control product).

The product of the present invention was produced in the following way. The ground fish mixture was prepared as described above but without the addition of glucose during the mixing. Cylindrical fish-paste product pieces were molded from the fish mixture, subjected to gelation heating at 45° C. for 7 minutes, immersed in a dilute solution containing 0.8% of glucose for 3 seconds, and then subjected to burner heating at 250° C. for 3 minutes to obtain the baked cylindrical fish-paste product of the present invention. In comparison with the control product, the product of the present invention was uniformly colored with a brilliant brown color.

EXAMPLE 4

One hundred (100) parts of ground Alaska pollack meat, 2.6 parts of sodium chloride, 10 parts of starch, 0.5 part of sodium glutamate and 18 parts of water were mixed by stirring, and then 0.3 part of xylose and 1 part of an alcohol-fermentation seasoning agent were added thereto, the mixture then being agitated. The ground fish mixture was then molded into balls. The molded balls wee heated in a low temperature pan (90° C.) for 7 minutes and subsequently in a high-temperature oil pan (180° C.) for 40 seconds to obtain fried fish-paste balls (hereinafter referred to as control product).

The product of the present invention was produced in the following way. The ground fish mixture was prepared as described above but without the addition of xylose and the alcohol-fermentation seasoning agent. Immediately thereafter, the fish mixture was molded into balls, which were then heated in a hot water pan (90° C.) for 7 minutes. Then, the resulting balls were soaked for 20 seconds in a 0.8% solution (50° C.) containing a 1 to 10 mixture of xylose and the alcohol-fermentation seasoning agent and subsequently heated in a hot-temperature oil pan (180° C.) for 40 seconds to obtain fried fish-paste balls of the present invention.

A comparison of the control product with the present product with respect to uniformity of coloring and fried color is shown in the following table.

|  | Control Product | Present Product |
| --- | --- | --- |
| (1) Fried Colors |  |  |
| Sample 1 | pale brown color | proper brown color |
| Sample 2 | pale brown color | proper brown color |
| Sample 3 | pale brown color | proper brown color |
| (2) Uniformity of Coloring |  |  |
| Sample 1 | nonuniform | uniform |
| Sample 2 | nonuniform | uniform |
| Sample 3 | nonuniform | uniform |

Furthermore, several pieces each of the control product and the present product were respectively packed in tuna No. 2 cans, and then subjected to retort heating at 120° C. for 40 minutes. The heated fried balls were cut, and the degrees of browning in the center portions thereof were checked.

The results are shown in the following table.

|  | Control Product | Present Product |
| --- | --- | --- |
| Sample 1 | yellow-brown | no browning(white) |
| Sample 2 | yellow-brown | no browning(white) |
| Sample 3 | yellow-brown | no browning(white) |
| Sample 4 | dark-brown | no browning(white) |

EXAMPLE 5

A comparison of the fried balls according to the conventional process with those according to the present invention employing an immersion step was made with respect to the fried color of the ball products.

The following components were mixed by agitation.

| ground Alaska pollack meat | 100 parts |
| --- | --- |
| sodium chloride | 2.6 parts |
| starch | 10 parts |
| sodium glutamate | 0.5 part |
| water | 18 parts |
| xylose | 0.3 part |
| "mirin" (sweet Japanese wine) | 1.0 part |

The formulated ground fish mixture was molded into balls each of 12 grams. The molded balls were heated in a low-temperature oil pan (120° C.) for 2 minutes and then in a high-temperature oil pan (180° C.) for 40 seconds to obtain fried fish-paste balls (hereinafter referred to as control product).

As an embodiment of the present invention, a formulated ground fish mixture was prepared as described above but without the addition of the xylose and "mirin" which were to cause marked browning. Fish meat balls each of 12 grams were molded from the formulated mixture. The balls were then immersed in a 0.8% dilute solution (50° C.) containing a 1:10 mixture of xylose and "mirin" (prepared separately) for 20 seconds, and heated in a low-temperature oil pan (120° C.) for 2 minutes and then in a high-temperature oil pan (180° C.) for 40 seconds. Fried fish-paste balls of the present invention were thus obtained.

Comparison of the control product with the present product was made with respect to fried color. The results are shown below.

|  | Control Product | Present Product |
| --- | --- | --- |
| fried color | somewhat deep brown color, and uniform color | substantially the same color as the control product, and uniform color |

These results are substantially the same relative to appearance. Furthermore, 5 pieces each of the control product and of the present product were respectively packed in tuna No. 2 cans which were further filled with water and then subjected to retort heating (125° C./40 minutes).

Then, the heated products were taken out of the cans and cut into half, and the degrees of browning in the center portions of the fried balls were checked. The results are shown below.

|  | Control Product | Present Product |
| --- | --- | --- |
| Degree of browning | Considerable browning took place from the inner side of the surface to the center portion of the ball; the balls were of low grade. | Fried surface color was pleasant. The color of the inside portion was whitish and the same as the color before the retort heating; the balls were of good grade. |

From these results, it was found that the color tone of the interior portion of the product of the present invention can be maintained even after the retort heating.

What is claimed is:

1. In a method of production of a fish-paste product wherein a molded product of ground fish meat is subjected to retort sterilization during which the core of the molded product is heated at a sterilization temperature which is sufficient to color the ground fish meat due to the Maillard reaction, the improvement which comprises:

prepáring a molded product of ground fish meat which is free of sugar and sugar-amino acid mixtures in a quantity that causes the ground fish meat to become colored due to the Maillard reaction which takes place during said retort sterilization;

applying onto the surface of the molded product a color-forming agent selected from the group consisting of sugar and a sugar-amino acid mixture, wherein said color-forming agent is in the form of a solution or powder; and subjecting the molded product to said retort sterilization whereby color due to the Maillard reaction is developed on the surface of the molded product as a result of the sugar or sugar-amino acid mixture which has been applied on said surface, without substantially coloring the core of the molded product.

2. The method according to claim 1, in which the step of applying the color-forming agent onto the surface of the ground fish meat molded product comprises immersing the molded product in a solution of the color-forming agent.

3. The method according to claim 2, in which the heating is carried out outside of the solution.

4. The method according to claim 2, in which the heating is carried out in the solution.

5. The method according to claim 1, in which the step of applying the color-forming agent onto the surface of the ground fish meat molded product comprises spraying a solution of the color-forming agent onto the molded product.

6. The method according to one of claims 2 through 5, or 1 in which the ground fish meat molded product to be surface-colored is a product which has not been substantially heated.

7. The method according to one of claims 2 through 5 or 1, in which the ground fish meat molded product to be surface-colored is a product which has been substantially heated.

8. A fish-paste product which comprises a molded product of ground fish meat packaged in a sealed container, the molded product having only on the surface thereof a color-forming agent selected from the group consisting of sugar and a mixture of sugar and amino acid in a quantity effective to cause color formation due to a Maillard reaction, the molded product having undergone retort sterilization in the sealed container and being colored substantially only on the surface due to the Maillard reaction which has taken place during said retort sterilization, and the ground fish meat before being molded being free of a color-forming agent selected from sugar and a sugar-amino acid mixture in a quantity that causes the ground fish meat to be colored due to the Maillard reaction which takes place under heating of said retort sterilization.

9. A fish-paste product which comprises a molded product of ground fish meat packaged in a sealed container, the molded product having undergone retort sterilization in the sealed container and being colored substantially only on the surface thereof due to the Maillard reaction which takes place during heating under said retort sterilization, and the ground fish meat before being molded being free of a color-forming agent selected from sugar and a sugar-amino acid mixture in a quantity that causes the ground fish meat to become colored due to the Maillard reaction which takes place during said retort sterilization.

10. The fish-paste product according to claim 9, in which the sealed container is a can.

11. The fish-paste product according to claim 9, in which the sealed container is a pouch of a plastic film and/or a metal foil.

12. The fish-paste product according to claim 10 or 11, in which the product has been produced by a method which comprises applying a color-forming agent selected from the group consisting of sugars and mixtures of sugars and amino acids onto the surface of a ground fish meat molded product and then heating the molded product thus coated thereby to develop color on only the surface thereof.

13. The fish-paste product according to claim 12, in which the color development has been carried out in advance of the sterilization.

14. The fish-paste product according to claim 12, in which the color development has been carried out simultaneously with sterilization.

15. The fish-paste product according to one of claims 10, 11, 9 or 8 in which said retort sterilization comprises heating at least at a temperature and for a duration which are equivalent to the combination of heating at about 120° C. for about 4 minutes.

16. The fish-paste product according to claim 15, in which said retort sterilization is carried out in a pressure vessel.

* * * * *